United States Patent [19]

Pernicone et al.

[11] Patent Number: 4,789,657

[45] Date of Patent: Dec. 6, 1988

[54] PROCESS FOR PREPARING IRON-BASED CATALYSTS FOR THE SYNTHESIS OF AMMONIA AND CATALYSTS SO OBTAINED

[75] Inventors: Nicola Pernicone, Novara; Francesco Ferrero, Pernate; Antonio Gennaro, Cameri, all of Italy

[73] Assignee: Fertimont S.p.A., Milan, Italy

[21] Appl. No.: 112,051

[22] Filed: Oct. 23, 1987

Related U.S. Application Data

[63] Continuation of Ser. No. 855,376, Apr. 24, 1986, abandoned, which is a continuation of Ser. No. 745,202, Jun. 17, 1985, abandoned.

[30] Foreign Application Priority Data

Jun. 19, 1984 [IT]  Italy .............................. 21482 A/84

[51] Int. Cl.$^4$ ...................... B01J 21/04; B01J 21/08; B01J 23/78
[52] U.S. Cl. .................................. 502/243; 502/338; 423/363
[58] Field of Search ............... 502/258, 328, 330, 336, 502/338; 423/362, 363

[56] References Cited

U.S. PATENT DOCUMENTS

| | | | |
|---|---|---|---|
| 2,469,755 | 5/1949 | Voorhies | 502/330 X |
| 3,243,386 | 3/1966 | Nielsen et al. | 502/328 X |
| 3,417,031 | 12/1968 | Hinrichs et al. | 502/338 |
| 3,644,216 | 2/1972 | Egalon et al. | 502/258 X |
| 4,379,078 | 4/1983 | Lytkin et al. | 502/328 X |

OTHER PUBLICATIONS

Above references were cited in parent application Ser. No. 855,376.

*Primary Examiner*—W. J. Shine
*Attorney, Agent, or Firm*—Stevens, Davis, Miller & Mosher

[57] ABSTRACT

A process for preparing iron-based catalysts for the synthesis of ammonia by melting of magnetite along with metal oxides as promoters, subsequent cooling of the molten mass and reduction thereof to the desired size, wherein the abovesaid cooling occurs at a rate higher than 25° C./min., preferably ranging from 100° C. to 1600° C./min., at a temperature ranging from 1700° C. to 700° C.

The present invention relates to a process for preparing iron-based catalysts having a high activity in the ammonia synthesis, and to the catalyst so obtained.

10 Claims, 1 Drawing Sheet

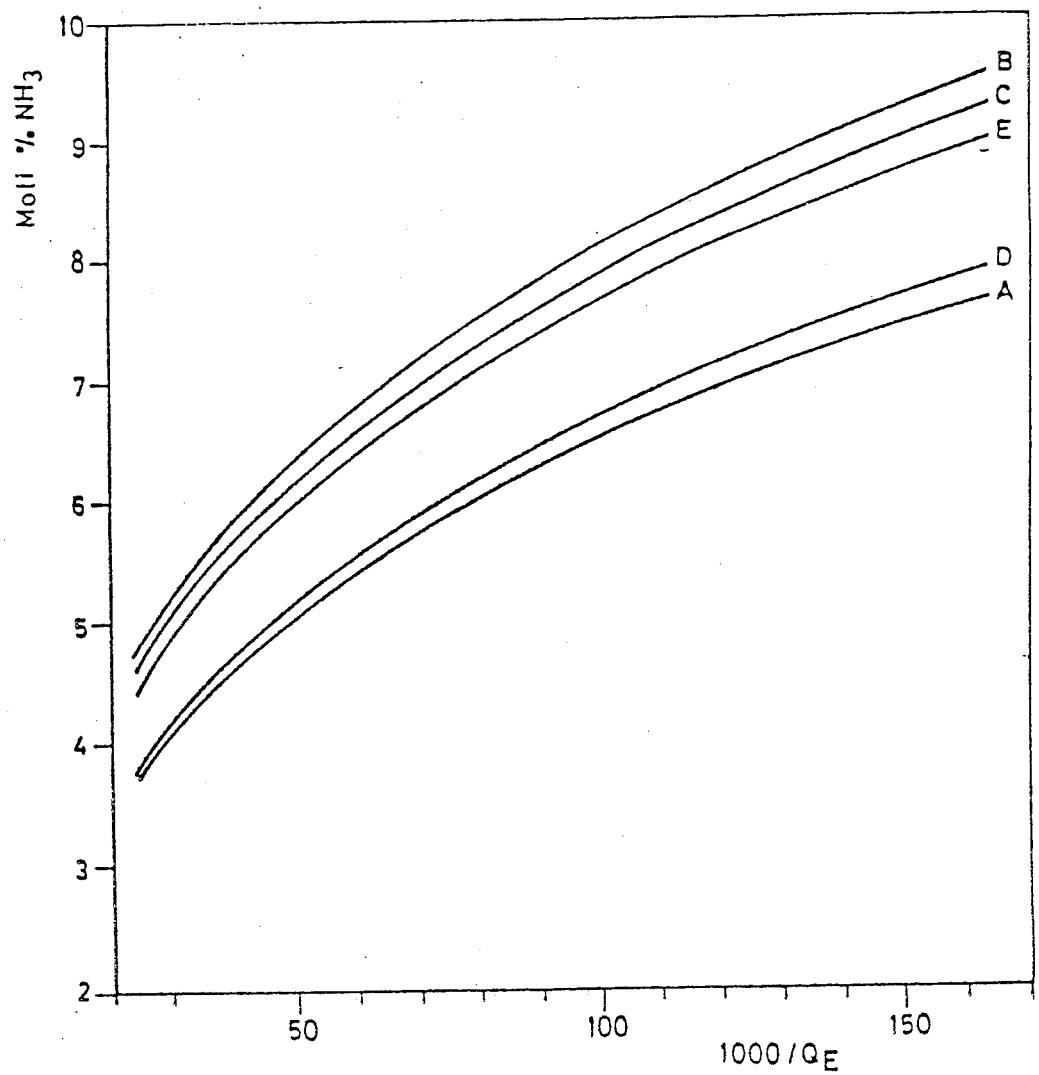

PROCESS FOR PREPARING IRON-BASED CATALYSTS FOR THE SYNTHESIS OF AMMONIA AND CATALYSTS SO OBTAINED

This application is a continuation of application Ser. No. 855,376, filed Apr. 24, 1986, which in turn is a continuation of application Ser. No. 745,202 filed, June 17, 1985, both now abandoned.

BACKGROUND OF THE INVENTION

As is known, ammonia is commercially produced starting from a nitrogen-hydrogen stoichiometric mixture according to the following exothermic reaction:

$$N_2 + 3H_2 \rightleftarrows 2NH_3$$

Since the ammonia concentration at the equilibrium increases—according to the chemical thermodynamics laws—as the pressure increases or as the temperature decreases, it follows that if one wants to operate at lower pressures, it is advisable to employ lower temperatures to avoid an excessive productivity reduction. A progressive decrease in the synthesis pressure is being since many years a constant trend in this type of process.

More recently, the imperative necessity to reduce the energetic costs has rendered particularly convenient the development of processes characterized by synthesis pressures ranging from 50 to 100 atm., instead of the generally employed 150-300 atm. The unavoidable decrease in the reaction rate related to both the lower pressure and the lower temperature, which becomes necessary to maintain favourable equilibrium conditions, makes it difficult to practise a low pressure process (50-100 atm.) using the catalysts known at present.

Therefore it becomes necessary to find out catalysts endowed with a higher activity.

The catalysts which are known for the ammonia synthesis consist of magnetite ($Fe_3O_4$) with the addition of small amounts (5-10% by weight) of some oxide-based promoters, difficult to be reduced, such as $Al_2O_3$, $K_2O$, $CaO$, $MgO$, $SiO_2$ and the like. The catalyst is activated in the reactor synthesis by reducing, with the nitrogen-hydrogen mixture, the magnetite to metal iron according to the endothermic reaction:

$$Fe_3O_4 + 4H_2 \rightleftarrows 3Fe + 4H_2O.$$

In a few cases such reduction is effected by the catalyst manufacturer in a proper plant and the reduced catalyst is then passivated on its surface with oxygen so as to permit the handling thereof in air, as it would be otherwise pyrophoric. This preliminarly reduced catalyst is then subjected to a short-lasting reducing treatment in the synthesis reactor in order to remove the surface oxide layer.

A slight improvement in the activity of the ammonia synthesis catalyst can be obtained by addition of cobalt (up to 10% by weight). The high cost of cobalt, amounting approximately to 100 times that of iron, however, renders such a catalyst little convenient.

As is known, the catalyst preparation consists in melting the mixture in powder, which is made of magnetite and of the oxide promoters, and in successively cooling the molten mass poured into proper collecting vessels.

The resulting solid product is then crushed, ground and screened to obtain the desired sizes.

Cooling of the molten mass is generally accomplished in sheet iron pans which are lined with a few-centimeter thick magnetite layer. Such layer has an insulating effect, wherefore very low cooling rates, generally around 2° C./min., are obtained.

On the other hand, in consideration of the technological problems involved by the treatment of high temperature materials, such as molten magnetite, mainly for commercial-scale preparations, the removal of the insulating layer is not possible in practice, in particular when iron cooling vessels are used, due to the low melting temperature of iron in respect of that of magnetite.

In the molten mass solidification technique it is known, from European patent application No. 82300749.7, that by pouring the melt into iron vessels having a properly grooved bottom and by selecting a suitable cooling velocity and a suitable thickness of the molten magnetite layer, it is possible to obtain, after crushing, catalyst granules having the desired size and being characterized by a roundish profile at least on one side.

The catalysts so prepared exhibit, in the ammonia synthesis, lower pressure drops and an activity exceeding about 7% the one of the present commercial catalysts.

From the foregoing it is apparent that the cooling velocities—not exactly indicated—attained according to the abovesaid technique employing iron vessels can be only of a few centrigrade degrees per minute.

In Bull. Chem. Soc. Japan, Vol. 29, pages 20-27, 1956, it is indicated that the quick cooling, by means of quenching techniques, of the molten catalyst does not lead to any improvement in the catalytic activity in the ammonia synthesis with respect to the usual cooling. It is furthermore indicated that a long-lasting catalyst annealing during 40 hours at 1000° C. causes a reduction in the catalyst activity.

DESCRIPTION OF THE INVENTION

We have now found that high cooling rates of the molten catalyst, in particular if they are attained by means of quenching techniques, lead to a considerable increase in the catalyst activity.

Thus, it is an object of the present invention to provide a catalyst for the ammonia synthesis which exhibits a by far higher activity that the one of the known commercial catalysts used at present.

Another object is that of preparing an iron-based catalyst particularly suitable for the commercial-scale synthesis of ammonia at pressures ranging from 50 to 100 atmospheres and at temperatures lower than 450° C.

It has now been found that the abovesaid objects are achieved if the molten catalyst is cooled at a cooling rate of at least 25° C./minute.

Thus, the object of the present invention resides in a process for preparing an iron-based catalyst for the ammonia synthesis by melting the magnetite or a mixture of iron oxides having the composition of the magnetite, along with 1-10% by weight of metal oxides as promoters, by subsequently cooling the molten mass and by reducing it to the desired size, the process being characterized in that the cooling of the molten mass is accomplished at a rate higher than 25° C./min., and preferably ranging from 100° C. to 1600° C./min., at temperatures of from 1700° C. to 700° C.

The best results, as regards the catalyst activity, were obtained by means of quenching in fluids, for example in water at 0° C. However quenching in air also gave excellent results.

A variant of the latter may consist in prilling techniques, for example by directing a molten magnetite jet against a plate made of a suitable material and rotating at such a speed as to obtain the catalyst directly in spheroidal granules having the desired dimensions. These techniques permit to reach cooling rates from 400° to 1600° C./min. in a temperature range of from 1700° C. to 700° C.

Of course, the utilization of such techniques for a commercial-scale production of catalysts based on magnetite involves the solution of technological problems of considerable difficulty as they regard the treatment of materials at very high temperatures.

The Applicant has found, however,—this being a further aspect of the present invention—that also with the equipment commonly utilized for the production of commercial catalysts based on magnetite it is possible to reach high cooling rates, around 200° C./min., capable of permitting to obtain high catalytic performances, in the ammonia synthesis, not much lower than the ones of the catalysts produced by quenching, provided that measures are taken directed to maximize the dispersion of the molten mass heat, once the mass is poured into the collecting vessels.

One of such measures consists in constructing the floor of the cooling pans with iron bricks, either square or rectangular, with sides up to 50 cm, and of such thickness as to promote as much as possible the heat dispersion, for example thickness of 4 cm or more.

The catalytic activities in the ammonia synthesis of the catalysts obtained according to the process of the present invention have proved to be higher by at least 50% and in a few cases also by 90%, in terms of reaction velocity, than the ones of the commercial catalysts based on magnetite.

Thanks to their high activity, the catalysts of the present invention are particularly suited to the ammonia synthesis at low pressures, i.e. 50–100 atm., and at low temperatures, below 450° C., with apparent technical and economic advantages.

It should be observed that the catalysts prepared by means of the techniques forming the objects of this invention exhibit very particular structural properties, which in particular are by far different from the ones of the present commercial catalysts.

In fact they are characterized by a reticular structure of magnetite crystallites, surrounded by promoter oxides, whose sizes range from 10 to 100 $\mu$m, preferably from 10 to 40 $\mu$m, as revealed by electron microprobe exposures of potassium promoter, while the magnetite crystallites of the known commercial catalysts have sizes up to 150–200 $\mu$m. Furthermore the catalysts according to the present invention show a X-ray diffraction pattern including at least one of the two following series of lines A and B, belonging to two different crystal phases or mixtures of crystal phases:

|   | d(Å)  | Intensity |
|---|-------|-----------|
| A | 8.48  | vw        |
|   | 5.63  | vw        |
|   | 4.57  | vvw       |
|   | 2.94  | vw        |
|   | 2.676 | vw        |
|   | 2.542 | vw        |
|   | 2.347 | vvw       |
|   | 2.080 | vw        |

-continued

|   | d(Å)  | Intensity |
|---|-------|-----------|
| B | 5.13  | vvw       |
|   | 2.609 | w         |
|   | 2.477 | vw        |
|   | 2.368 | vvw       |
|   | 2.228 | vvw       |
|   | 1.656 | vvw       |
|   | 1.644 | vw        |
|   | 1.627 | vvw       |
|   | 1.576 | vw        |
|   | 1.556 | vvw       |
|   | 1.467 | w         |

The catalyst prepared by the process of the present invention is obtainable also in the pre-reduced state, according to the modalities of the art.

It is also preparable in the form of little balls or cylinders, by means of forming operations—known to those skilled in the art—of powder obtained by grinding.

It has been ascertained that the preparation methods herein described can be advantageously employed also for cobalt-containing, iron-based catalysts.

BRIEF DESCRIPTION OF THE DRAWING

The curves shown in the drawing indicate the ammonia mole percentages (Moles % NH$_3$) as a function of the inverse of the feeding gaseous flowrate in Nl/h (1000/$Q_E$) for each single catalyst of the examples when tested for catalytic activity according to Example 1 at 400° C. and 70 Kg/cm$^2$ pressure with a H$_2$+N$_2$ 3:1 molar mixture. Curve A refers to the commercial comparison catalyst; curve B refers to the catalyst according to Example 1; curve C refers to the catalyst according to Example 2; curve D refers to the comparison catalyst of Example 3; and curve E refers to the catalyst according to Example 4.

The following examples are given to illustrate the invention, without being however a limitation thereof.

EXAMPLE 1

9.4 g of pure magnetite were mixed in an agate mortar with 0.29 g of Al$_2$O$_3$, 0.07 g of K$_2$O, 0.31 g of CaO, 0.03 g of MgO, 0.06 g of SiO$_2$ and the whole was transferred into a small platinum box of 1.3×5.5×1.0 of depth. The box was introduced in the middle of a Heraeus tubular muffle furnace, Model No. RoR 2.5/30 with rhodium strip-resistance and platinum wire connections for temperatures up to 1700° C. By means of a temperature programmer it was heated to 1600° C. during 2 hours approx., then from 1600° to 1650° C., with a temperature increase of 2.5° C./minute. The muffle furnace was maintained at a constant temperature of 1650° C. for 15 minutes, then the small box was rapidly taken out from the furnace and thrown into a water and ice bath (the average cooling rate from 1650° C. to 700° C. was of about 1600° C./min.). The solidified product was removed from the box, ground in an agate mortar and screened between 297 and 500 $\mu$m.

The product shows a reticular structure of magnetite crystallites having sizes of 20±5 $\mu$m, as evidenced by electron microprobe exposures of potassium promotor.

The X-ray diffraction pattern of the product shows the presence of both A and B phases.

1 g of such product was mixed with alumina having the same particle size in such amount as to have 5 cm$^3$ of mixture; the whole was charged into a microreactor of 1 cm² section, in order to measure the catalytic activity.

Such measuring was carried out, after reduction with pure hydrogen, under standard and strictly controlled conditions.

The results were then compared with the ones obtained under identical conditions with a broadly utilized commercial catalyst having the same chemical composition.

The results of such comparison are indicated in FIG. 1, where a diagram shows the ammonia percentages, obtained at 400° C. and 70 Kg/cm² gauge with a $H_2 + N_2$ 3:1 molar mixture, as a function of the inverse of the feeding gaseous flowrate in N l/h.

Curve A represents the results obtained with the comparison commercial catalyst, while curve B represents the results obtained with the catalyst prepared according to this example.

A percent average increase in the catalytic activity at 400° C., with respect to the commercial catalyst, of 25% in terms of conversion and of 89% in terms of reaction rate is inferable from such results.

EXAMPLE 2

The preparation described in example 1 was repeated, except that the small box containing the molten catalyst was allowed to cool in air after having been taken out from the furnace. In such case the cooling rate from 1650° C. to 700° C. was of about 400° C./minute.

Subsequently the catalytic activity was measured as described in the preceding example. The results are reported in FIG. 1, curve C, wherefrom it is calculated an average activity increase at 400° C., with respect to the commercial catalyst, curve A, of 21%, in terms of conversion and of 73% in terms of reaction rate.

EXAMPLE 3

(comparative test)

The preparation described in example 1 was exactly repeated, with the only exception that the small box containing the molten catalyst, instead of being taken out from the furnace, was left in the furnace and caused to cool at a constant rate of 4° C./minute.

The product shows the presence of magnetite crystallites having sizes up to 180 μm, as evidenced by electron microprobe exposures of potassium promotor. The X ray diffraction pattern does not show the presence of crystal phases A and/or B.

The catalytic activity was then measured as described in example 1. The results reported in FIG. 1, curve D, show that the activity is very similar to that of the commercial catalyst, curve A.

EXAMPLE 4

An electrothermic industrial furnace having a capacity of about 600 Kg was charged with a mixture in powder having the composition indicated in example 1. The powder was caused to completely melt during about 4 hours. The melt was conveyed, through a side opening, to an iron sloping chute, from which , after having been divided into two almost equal jets by means of a knife divisor, it fell into two rectangular (4×1 m) iron pans.

The bottom of such pans was constructed by means of iron bricks having dimensions 25×30×4 cm depth, in order to obtain a prompt heat dispersion. The average cooling rate was of about 200° C./min. in a temperature range of from 1700° C. to 700° C. After complete cooling, the solid product was crushed, ground and screened from 297 to 500 μm, in order to carry out the catalytic activity test as described in example 1. The obtained results, curve E in FIG. 1, compared with those of a broadly employed commercial catalyst having the same chemical composition, curve A, show an average percent increase in the catalytic activity at 400° C., with respect to the commercial catalyst, of 18% in terms of conversion and of 66% in terms of reaction rate.

What is claimed is:

1. A process for preparing an ammonia synthesis catalyst based on iron by melting magnetite or a mixture of iron oxides having the composition of magnetite, together with 1 to 10% by weight of a mixture of $Al_2O_3$, $K_2O$, CaO, MgO, and $SiO_2$ as promoter, subsequently cooling the melt, and reducing same to the desired size, characterized in that the cooling of the melt is accomplished by quenching at a rate higher than 25° C./minute.

2. The process according to claim 1, in which the cooling by quenching of the melt is accomplished at a rate ranging from 100° C./min. to 1600° C./min. in a temperature range from 1700° C. to 700° C.

3. The process according to claim 1 or 2, in which the cooling by quenching is accomplished by pouring the melt into an iron vessel, the bottom of which consists of iron bricks having such a thickness as to secure the maximum heat dispersion.

4. The process according to claim 3, in which the thickness of the iron bricks is at least 4 cm.

5. The process according to claim 1 or 2, in which the cooling by quenching is accomplished by immersing the melt into a fluid.

6. The process according to claim 5, in which the fluid is water or air.

7. An ammonia synthesis catalyst based on iron, when prepared according to the process of claim 1 or 2.

8. An ammonia synthesis catalyst based on iron consisting essentially of magnetite together with 1 to 10% by weight of the said mixture as promoter, when prepared according to the process of claim 1 or 2, and characterized in that it has a reticular structure of the magnetite crystallites, surrounded by promoter oxide, whose sizes range from 10 to 100 μm.

9. A catalyst according to claim 8, characterized in that the sizes of the magnetite crystallites range from 10 to 40 μm.

10. An ammonia synthesis catalyst based on iron consisting essentially of magnetite together with 1 to 10% by weight of a mixture of metal oxides as defined below as promoter, and prepared by melting magnetite or a mixture of iron oxides having the composition of magnetite, together with 1 to 10% by weight of a mixture of $Al_2O_3$, $K_2O$, CaO, MgO, and $SiO_2$ as promoter, subsequently cooling the melt, and reducing same to the desired size, characterized in that the cooling of the melt is accomplished by quenching at a rate higher than 25° C./minute, and in that the catalyst has a reticular structure of magnetite crystallites, surrounded by promoter oxide, whose sizes range from 10 to 100 μm, and further characterized in having an X-ray diffraction pattern including at least one of the two following series of lines A and B:

| | d(Å) | Intensity |
|---|---|---|
| A | 8.48 | VW |
| | 5.63 | VW |
| | 4.57 | VVW |
| | 2.94 | VW |
| | 2.676 | VW |
| | 2.542 | VW |
| | 2.347 | VVW |
| | 2.080 | VW |
| B | 5.13 | VVW |
| | 2.609 | W |
| | 2.477 | VW |
| | 2.368 | VVW |
| | 2.228 | VVW |
| | 1.656 | VVW |
| | 1.644 | VW |
| | 1.627 | VVW |
| | 1.576 | VW |
| | 1.556 | VVW |
| | 1.467 | W | where "V" means very and "W" means weak.

* * * * *